United States Patent [19]

Eng et al.

[11] Patent Number: 4,754,451
[45] Date of Patent: Jun. 28, 1988

[54] N-BY-N "KNOCKOUT" SWITCH FOR A HIGH-PERFORMANCE PACKET SWITCHING SYSTEM WITH VARIABLE LENGTH PACKETS

[75] Inventors: Kai Y. Eng, Middletown; Michael G. Hluchyj, Little Silver; Yu S. Yeh, Freehold, all of N.J.

[73] Assignee: American Telephone and Telegraph Company, AT&T Bell Laboratories, Murray Hill, N.J.

[21] Appl. No.: 893,610

[22] Filed: Aug. 6, 1986

[51] Int. Cl.⁴ ............................................. H04Q 11/04
[52] U.S. Cl. ......................................................... 370/60
[58] Field of Search ................. 370/60, 94; 340/825.5, 340/825.51, 825.52

[56] References Cited

U.S. PATENT DOCUMENTS

| | | | |
|---|---|---|---|
| 4,058,672 | 11/1977 | Crager et al. | 178/3 |
| 4,456,989 | 6/1984 | Johnson et al. | 370/94 |
| 4,486,878 | 12/1984 | Havermans | 370/60 |
| 4,561,090 | 12/1985 | Turner | 370/94 |
| 4,577,308 | 3/1986 | Larson et al. | 370/9 |
| 4,603,416 | 7/1986 | Servel et al. | 370/60 |
| 4,630,258 | 12/1986 | McMillen et al. | 370/94 |

OTHER PUBLICATIONS

Inose, An Introduction to Digital Integrated Communication Systems, U. of Tokyo Press, 1979, pp. 87, 91–96, 103–145, 149–155, 163–186.
Inukai, IEEE, Trans. Comm., vol. COM-27, No. 10, Oct. 1979, pp. 1449–1455.
Dias et al., GLOBECOM '84, No. 1984, Atlanta, Ga., pp. 5.2.1–5.2.7.
Lim, IEEE IFOCOM '85, Mar. 26–28, 1985, Washington, D.C., pp. 4–9.
Daigle et al., IEEE INFOCOM '85, Mar. 26–28, 1985, Washington, D.C., pp. 18–26.

Primary Examiner—Douglas W. Olms
Attorney, Agent, or Firm—Erwin W. Pfeifle

[57] ABSTRACT

The present invention relates to an N-input, N-output "Knockout" packet switch (11) which uses decentralized control and distributed routing for routing high-speed, time-multiplexed, variable-length packets of information from the N inputs to the N outputs. More particularly, within the switch, the N input signals are separately synchronized such that the start of each arbitrarily arriving variable-length packet is synchronized to the start of a next mini time period of a sequence of mini time periods common to all inputs. The synchronized N input signals then propagate along separate broadcast buses (14) to each of N bus interface units (15) which include N packet filters (20), a concentrator (21) and a shared buffer (22) capable of processing variable-length packets. Each bus interface unit is associated with a separate one of the N outputs (12) of the switch, and the N packet filters therein are each associated with a separate one of the N broadcast buses for detecting if a packet on the associated bus is destined for the associated switch output. The concentrator is used to (a) reduce the number of separate buffers needed to receive packets which may arrive simultaneously and are destined for the associated output, and (b) only directs a maximum of L concurrently arriving packets to the shared buffer while discarding, or "knocking" out, the remainder. Contending packets at the output of the concentrator are stored in the shared buffer before placement on the output line on a first-in, first-out basis. The discarded packet rate of the "knockout" switch can be made as small as desired and latency of packets in the switch is the smallest achievable by any comparable switch.

11 Claims, 8 Drawing Sheets

N-BY-N "KNOCKOUT" SWITCH FOR A HIGH-PERFORMANCE PACKET SWITCHING SYSTEM WITH VARIABLE LENGTH PACKETS

TECHNICAL FIELD

The present invention relates to a switching arrangement for routing high-speed, time-multiplexed variable-length packets of information from N inputs to N outputs in a high-performance packet switching system. More particularly, the present switch uses distributed control and a fully interconnectable configuration to route arbitrarily arriving variable-length packets from the N switch inputs to their appropriate outputs using a single stage of switching which includes a minimum amount of buffering and provides the lowest packet latency in any switching arrangement.

DESCRIPTION OF THE PRIOR ART

Every type of communication network interconnecting more than two users depends on some form of switching to efficiently route information among the various users. In such switches, the traffic presented at two or more inputs may be destined for a common output. There are basically only two ways that such a situation can be managed.

First, the switch may require a controller that schedules the arrivals of packets to avoid conflict. The classic Time-Space-Time switch shown in FIG. 3.6 at page 95 of the book by H. Inose entitled "An Introduction To Digital Integrated Communications Systems", University of Tokyo Press, Tokyo, Japan, 1979, falls into this category. There, each input to the switch is preceded by a Time Slot Interchange to rearrange the time sequence of the time-multiplexed traffic so that, when presented to the switch, the data appearing at the N inputs are, at all times, destined for distinct separate outputs. However, scheduling is a difficult task, as shown by T. Inukai in *IEEE Transactions on Communications*, Vol. COM-27. No. 10, October 1979 at pages 1449–1455 and, although feasible and adequate for circuit switching, requires too much time to determine permissible input/output combinations to be applicable for packet switching.

The second way, and perhaps the more attractive approach for managing contention, employs decentralized control and distributed routing wherein each packet or burst of traffic contains a header bearing the destination port of the switch for that packet, where the header is used in routing the packet through the switch. Without the coordination afforded by the central scheduler, the switch must now recognize conflict among its inputs and internally store, or buffer, all but at most one of several simultaneous arriving packets destined for a common output, thereby leading to statistical delay, or latency, within the switch. Such self-scheduling switches, as shown in the article by D. M. Dias et al. in *GLOBECOM '84*, Vol. 1, Atlanta, Ga., Nov. 26–29, 1984, pages 5.2.1–5.2.7, typically employ binary switching elements appropriately interconnected and arranged to form a multistage switch. These switches have tended to emphasize a reduction in the number of switch elements needed to a value below that of a fully connected arrangement, one wherein each input has a dedicated path to each output and thereby requiring $N^2$ elements. In addition to congestion at the outputs, these element-efficient switches can also congest at each of the binary switch points, thereby requiring that additional measures be taken, such as buffering within each element. Because these autonomous buffers cannot be shared among elements, the complexity of the buffering is typically much greater than that of the binary switching elements themselves. Moreover, the delay encountered within the network is greater than the unavoidable component caused by destination congestion alone.

The problem remaining in the prior art is to provide a switch which (a) can be used to switch packets which arrive arbitrarily at the N inputs of the switch and include variable lengths and (b) avoids (1) the scheduling problems encountered with switches requiring controllers, and (2) the buffering complexity and delays encountered by the decentralized control and distributed routing switches.

SUMMARY OF THE INVENTION

The foregoing problem in the prior art has been solved in accordance with the present invention which relates to a switching arrangement for routing high-speed, time-multiplexed variable-length packets of information from N inputs to N outputs in a high-performance packet switching system. The present switch uses distributed control and a fully interconnectable configuration to passively route arriving variable-length packets to their appropriate outputs using a single stage of switching.

It is an aspect of the present invention to provide a switching arrangement for routing multiple variable-length high-speed, time-multiplexed packets of information from the N inputs to the N outputs using decentralized control and distributed routing. The switching arrangement comprises two basic characteristics: (1) each input has a separate broadcast bus, and (2) each output has access to the packets of information arriving on all inputs. More particularly, each output passively interfaces to the complete set of N input buses and provides several important features. First, no switch blocking occurs where packets destined for one output interfere with packets going to other outputs. Second, the broadcast buses can reside on an equipment backplane with the circuitry for each of the N input/output pairs placed on a single plug-in circuit card. Third, with each bus being driven by only one input it allows for a higher transmission rate on the buses than found with a shared parallel bus accessed by all inputs. Lastly, since every input is available at the interface to every output, arriving packets can be addressed to, and received by, multiple outputs and thereby lends itself to broadcast and multicast features.

It is a further aspect of the present invention to provide a "Knockout" switching arrangement for routing variable-length, high-speed, time-multiplexed packets of information from N inputs to N outputs using decentralized control and distributed routing. Structurally, each of the N input signals has the start of each of its arbitrarily arriving variable-length packet synchronized to the start of a next mini time period of sequential mini time periods common to all inputs, where each mini time period is less that the length of any packet of information. The N input signals propagate along separate buses to each of N bus interface units which include N packet filters, a concentrator and a shared buffer. Each bus interface unit is associated with a separate one of the N outputs, and the N packet filters therein are each associated with a separate one of the N buses for detecting if a packet on the associated bus is destined for the associated output using an address disposed in the packet during a first mini-time period. The concentrator is used at each output to reduce the number of separate buffers needed to receive simultaneously arriving packets. The contending packets are stored in the shared buffer before placement on the output line on a first-in, first-out basis.

Other and further aspects of the present invention will become apparent during the course of the following description and by reference to the accompanying drawings.

BRIEF DESCRIPTION OF THE DRAWINGS

Referring, now to the drawings in which like numerals represent like parts in the several views.

DETAILED DESCRIPTION

The switching arrangement in accordance with the present invention includes an N-input, N-output packet switch using decentralized control and distributed routing with all inputs and outputs operating at the same bit rate. Variable-length packets arrive at the N inputs $10_1$ to $10_N$ of the present N-by-N switch 11 in a manner in which each input includes sequential packets having destinations as determined by the individual remote N transmitters sending the packets, as shown in the exemplary sequences of FIG. 1. Each packet in such arrangement contains, somewhere therein, the address of its destination output as shown in the exemplary packet format of FIG. 3.

Figure 1:
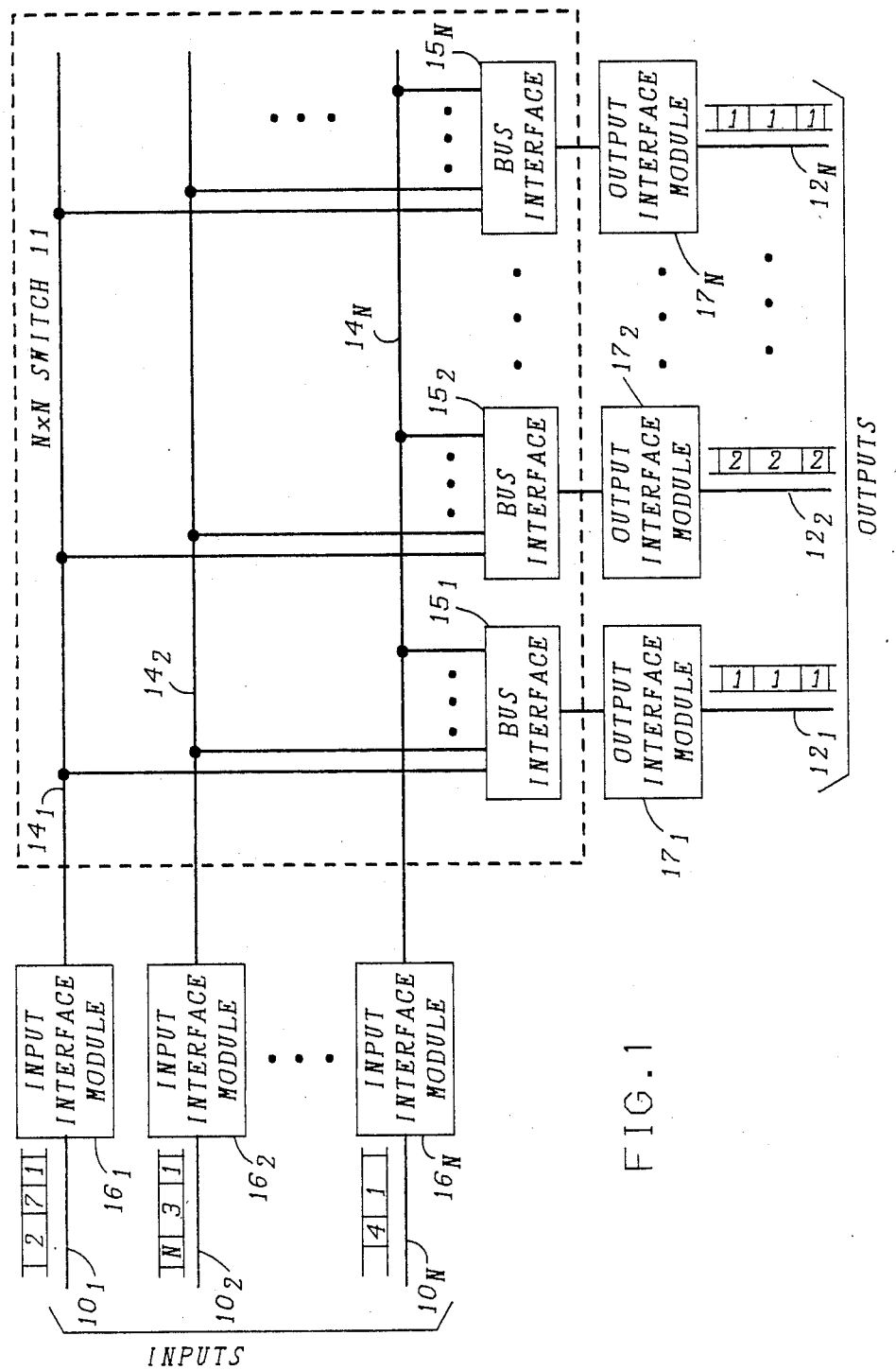
FIG. 1 illustrates a block diagram of an N-input, N-output time slotted packet switching arrangement in accordance with the present invention including typical different length packets arriving in a time-slotted sequence at the N inputs and routed to the appropriate N outputs.

Aside from having control over the average number of packet arrivals destined for a given output, no control over the specific arrival times of packets on the inputs and their associated output addresses is assumed. In other words, there is no sequential specific scheduling that prevents two or more packets from arriving at different inputs in the same or overlapping time period and destined for the same output, as shown in FIG. 1 for the arriving inputs $10_1$, $10_2$ and $10_N$ which include overlapping packets that are destined for output $12_1$. The addressing information included in each packet is used by N-by-N packet switch 11 to route the incoming packets to their appropriate outputs $12_1$ to $12_N$. Hence, to avoid lost packets, or at least provide a sufficiently small probability thereof, at a minimum, packet buffering must be provided in switch 11 to smooth fluctuations in packet arrivals destined for the same output.

The interconnection arrangement for N-by-N packet switch 11 has two basic characteristics: (1) each input $10_1$ to $10_N$ is associated with a separate broadcast bus $14_1$ to $14_N$, respectively, and (2) each output $12_1$ to $12_N$ has access to all packets arriving on all inputs. As shown in FIG. 1, packets arriving at each of the N inputs $10_i$ are processed by a separate input interface module $16_i$ and placed directly on a separate broadcast bus $14_i$, and each output $12_1$ to $12_N$ of switch 11 passively interfaces to the complete set of N buses 14 via a separate bus interface unit $15_1$ to $15_N$, respectively and then respective output interface modules $17_1$ to $17_N$. This simple structure provides several important features within switch 11. First, with each input having a direct path to every output, no switch blocking occurs where packets destined for one output interfere with (i.e., delay or block) packets going to other outputs. The only congestion in the switch takes place at the bus interface unit $15_i$ to each output $12_i$, where packets can arrive concurrently on different input lines 10 destined for the same output $12_i$. Without a priori scheduling of packet arrivals, this type of congestion is unavoidable, and dealing with it typically represents the greatest source of complexity within a packet switch. This complexity is minimized by the present N-by-N packet switching arrangement 11.

Figure 3:
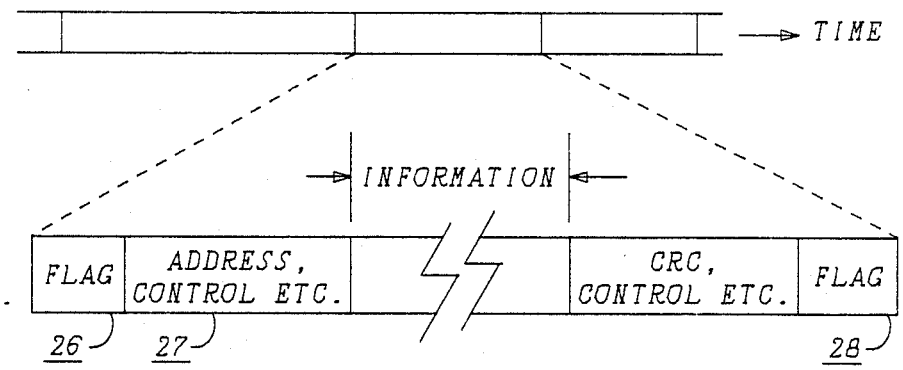
FIG. 3 illustrates an exemplary packet format received by an input interface module of FIG. 1.
Figure 4:
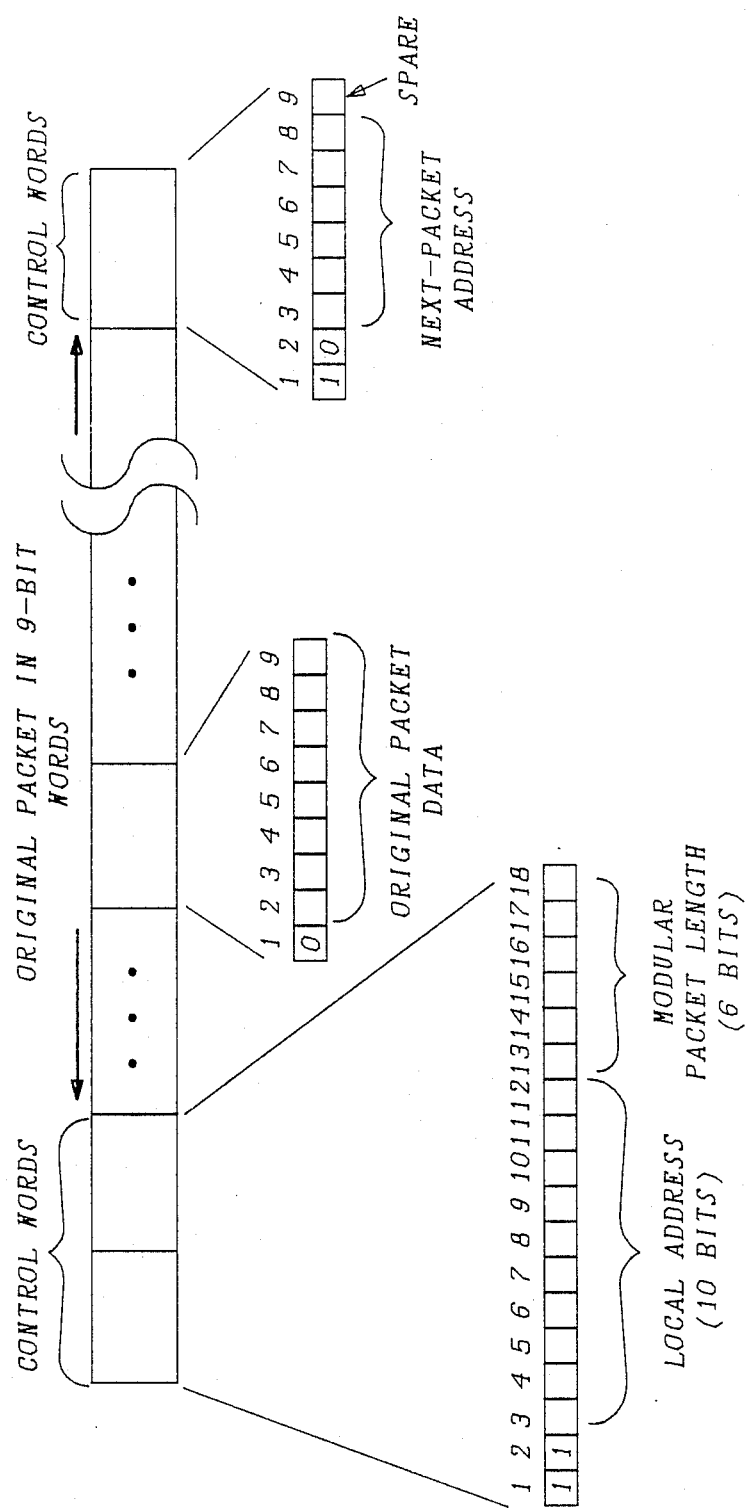
FIG. 4 illustrates an exemplary packet format at the output of an input interface module in FIG. 1.

The input and output modules $16_i$ and $17_i$ are usually necessary in practical applications because of the large variety of line signals and packet protocols available, where the present "Knockout" switch is proposed to be compatible with most of them. The input interface modules $16_i$ are each designed to accept a digital stream at a high-speed rate of R Mb/s, where, for example, R=45 Mb/s hereinafter. Each of these exemplary 45 Mb/s lines may carry incoming packets of different lengths, and different lines may carry packets of different protocols. An important function of the input interface module $16_i$ is to recognize the beginning and the end of each arriving packet from the associated line. For example, as shown in FIG. 3, a typical packet format may include a flag 26 in the beginning, followed by a control field 27 comprising address information plus some other control bits, then a number of information bits, some error control bits and finally terminated by a flag 28 at the end. In order to make the flags 26 and 28 unique in the digital sequence, it is customary to add "stuffing bits" to the original data. As an exemplary standard procedure, the input interface module $16_i$ should first strip off the framing flags 26 and 28 and then remove the stuffing bits. After doing so, the unframed and de-stuffed packet length is assumed to be an integer multiple of bytes. To the beginning of each of these bytes from the original packet, it is preferred that input interface module $16_i$ insert, for example, a single bit "0" to form exemplary successive 9-bit words. Furthermore, each input interface module $16_i$ attaches two exemplary 9-bit control words preceding this entire data sequence and appends an exemplary single 9-bit control word at its end as shown in FIG. 4. Because of the additional bit added to each byte in this process, the bit rate at the output of each input interface module $16_i$ is increased from the exemplary 45 Mb/s rate to the exemplary $R_o=9R/8$ Mb/s, or $9(45)/8=50.6$ Mb/s. This is done to facilitate the features of supporting self-routing and variable-length packets as will be described hereinafter.

In the newly formatted packet shown in FIG. 4, the three control words are seen to frame the original data bytes which have been expanded into exemplary 9-bit words with prefixed zeros. The first two control words span an 18-bit field which is called the control header and is marked uniquely by, for example, two leading 1's. The rest of the field preferably contains two pieces of special data comprising a 10-bit sequence called a local address and 6-bit sequence called a modular packet length. The local address denotes the specific output of "Knockout" switch 11 for which the packet is destined. With 10 bits available, up to 1024 outputs may be specified which is assumed to be the maximum switch dimensions. This local address is derived simply by looking at the address information in the original packet and then performing an address translation with a virtual circuit table. The modular packet length, on the other hand, is generally something that is not available in prior art packet protocols. Although this information is not absolutely required for present "Knockout" switch 11, it is suggested that the information be included.

A number of possibilities for including the modular packet length information exists. For example, the original packet protocol can usually be modified to carry one more control word at the packet originating source; or some packet length information can be added during its passing through an intermediate store-and-forward node. In any event, if the packet length information is available to input interface module $16_i$, it will be translated into an exemplary 6-bit digital word called the Modular Packet Length for insertion after the local address as shown in FIG. 4. This translation amounts to deciding which of the exemplary 64 predetermined packet sizes the current packet belongs to, and its actual implementation could be very simple. For example, if the maximum packet length is assumed to be 512 bytes, every packet length can be represented as a 9-bit digital word, and the Modular Packet Length can be defined as the most significant 6 bits of this 9-bit word. If the packet length is not available to the Input Interface Module, the default value becomes the maximum allowable packet size in the system. During high congestion periods, the smaller packets will have a higher probability of getting through switch 11 while the maximal length packets will stand the first chance to be dropped upon a buffer overflow.

After adding the two leading 9-bit control words to a newly arrived packet, the input interface module $16_i$ is ready to send data (in exemplary 9-bit words) to "Knockout" switch 11. But module $16_i$ has to do so in a synchronous manner governed by a clock (not shown) associated with switch 11. For example, bit synchronization is provided by a clock associated with switch 11 at the $R_o$ (exemplary 50.6 Mb/s) rate with word framing done at the exemplary $R_o/9$ rate. Moreover, the leading control words for each packet must be synchronized with the start of message clock which may be a clock pulse mark every 27 bits (or three 9-bit words), i.e., at the $R_o/27$ rate. More particularly, the start of each packet is synchronized with the next clock pulse mark after its arrival. Therefore, the transmissions from all input interface modules $16_i$ are done synchronously while the incoming packets arrive at the different input interface modules asynchronously. This implies that an elastic buffer has to built into each input interface module $16_i$. At the end of each packet transmission, the input interface module $16_i$ is also shown to append a single 9-bit control word in which the first bit is set to "1" to denote control; the second bit is set to "0" to denote end-of-transmission; and the remaining 7-bit field carries the Next-Packet address which is added inside switch 11 as will be explained hereinafter.

The output interface module $17_i$ is quite simple. It merely removes both the three control words framing each packet and the additional control bit added to each data byte. The net result is a packet as originally received minus the stuffing bits and flags. The packet can then be easily stuffed and flagged according to the specific protocol required for the output device or communication link. The physical transmissions from output interface module $17_i$ can then be matched to some external clock.

The broadcast bus structure of switch 11 in FIG. 1 has the desirable characteristic that each bus $14_i$ is driven by only one input $10_i$ from an associated Input Interface Module $16_i$. This allows for a higher transmission rate on the buses and a design more tolerant of faults compared with a shared parallel bus accessed by all inputs. In addition, the packet buffering and bus access control circuitry of the known shared parallel bus architecture is replaced in the present switch 11 by, at most, an elastic buffer at each input which is used to synchronize the time slots from the individual input lines.

Figure 2:
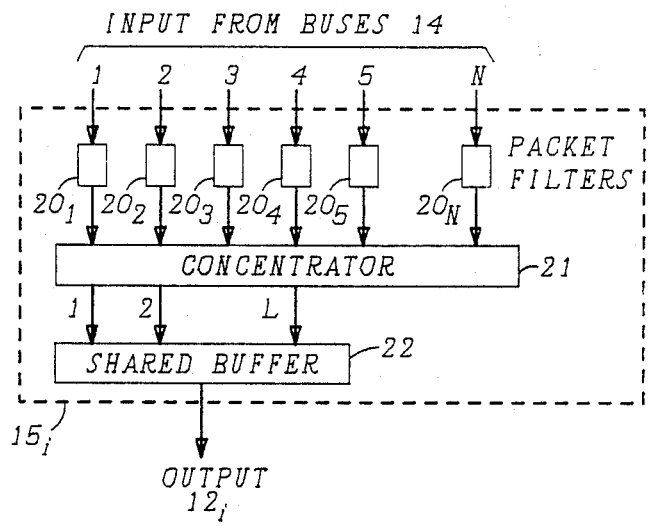
FIG. 2 is a block diagram of one of the N bus interface units of the switching arrangement of FIG. 1.

FIG. 2 is a block diagram of an exemplary bus interface unit $15_i$ associated with each output $12_i$ of N-by-N packet switch 11. The bus interface unit $15_i$ shown has three major components. First there is a row of N packet filters $20_1$ to $20_N$, with each packet filter receiving the packets propagating on a separate one of broadcast buses $14_1$ to $14_N$. In each packet filter $20_i$, the Local Address of each packet coming to its input is examined and a distinction between valid and invalid packets for the associated output is declared. In so doing, packet filter $20_i$ reduces the control header for all packets from the exemplary 18 bits to 9 bits. If the Local Address agrees with the associated output line number, the packet is valid and its control header will contain two leading 1's, with the rest of the space filled by the exemplary 6-bit Modular Packet length information plus a spare bit. For a mismatched or invalid packet, its new 9-bit control header will contain two leading 0's instead of 1's. The rest of the packet, however, will be completely unaltered. Although invalid packets are not physically blocked, they are in fact marked to be discarded in later stages by virtue of having two leading 0's in their control headers. Because all packets must synchronize their beginnings to the start-of-message clock, the checking of addresses can be done conveniently with, for example, only one shift register storing the relevant output line number.

The minimum delay from input to output through a packet filter $20_i$ is, for example, 12 bits, where 9 bit are from the first word of the original control header plus the leading 3 bits of the control header's second word. In practice, however, it might be advantageous to deliberately lengthen the delay to be exactly the exemplary 18 bits of the control header, or two 9-bit words, for easy maintenance of the synchronous clocks in the entire system. In any case, the N outputs carrying the packets with the short control headers are delivered to a concentrator 21 forming the second component of each bus interface unit.

Concentrator 21 receives the outputs of all associated packet filters $20_1$ to $20_N$ at separate inputs and achieves an N-to-L (L<<N) concentration of the input lines, where up to L concurrently received packets destined for an output making it through the packet filters emerge at the L outputs of concentrator 21. Therefore, concentrator 21 only has to deal with valid packets destined for an associated output, the number of which may conceivable vary from 0 to N. Concentrator 21, however, must be able to account for variable length packets. More particularly, once a connection is granted for a packet within concentrator 21, then it must be guaranteed for the entire duration of the packet, and contention for that path, or output, in concentrator 21 cannot be resumed until the completion of that packet's transmission.

To minimized hardware complexity, the constraint is added that all packets, although of different lengths, must start at the beginning of some narrow time slot, and thus the necessity of the start-of-message clock mentioned earlier. For circuit speed at the exemplary 50 Mb/s, N=128 and L=8, the minimum contention time required would be about 23 bit periods or approximately 460 nsec. By setting the start-of-message message clock to be $R_o/27$, i.e., each cycle contains three 9-bit words, it should be more than adequate to account for the contention required. A block diagram for an exemplary 128:8 concentrator 21 is shown in FIG. 5.

Figure 5:
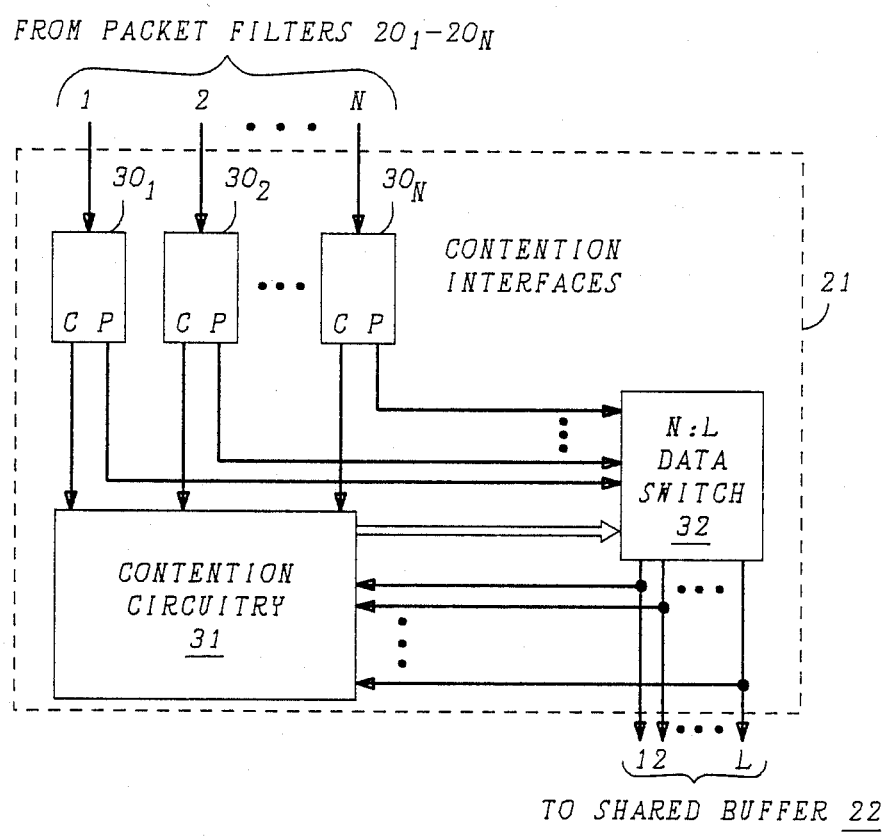
FIG. 5 is a block diagram of an exemplary arrangement of the concentrator of FIG. 2.

As shown in FIG. 5, the packets entering concentrator 21 are first passed through contention interfaces $30_1$ to $30_N$. Each contention interface performs two simple tasks: (1) it continuously looks for the pattern of two consecutive 1's in the beginning of each start-of-message cycle which signifies the arrival of a valid packet and reports the result to contention circuitry 31; and (2) it provides a fixed delay or, for example, D bits to the entire incoming bit stream. This delay D represents the combined total of the detection time for each valid packet arrival, the contention time required by contention circuitry 31 and the control set-up time needed by an exemplary 128:8 Data switch 32 before a reconfiguration. The contention and set-up times are, in turn, determined by the specific designs adopted. In the present arrangement, D is chosen to be, for example, 32 bits and it should be noted that the bit streams propagating through the contention interfaces are totally unchanged.

Figure 6:
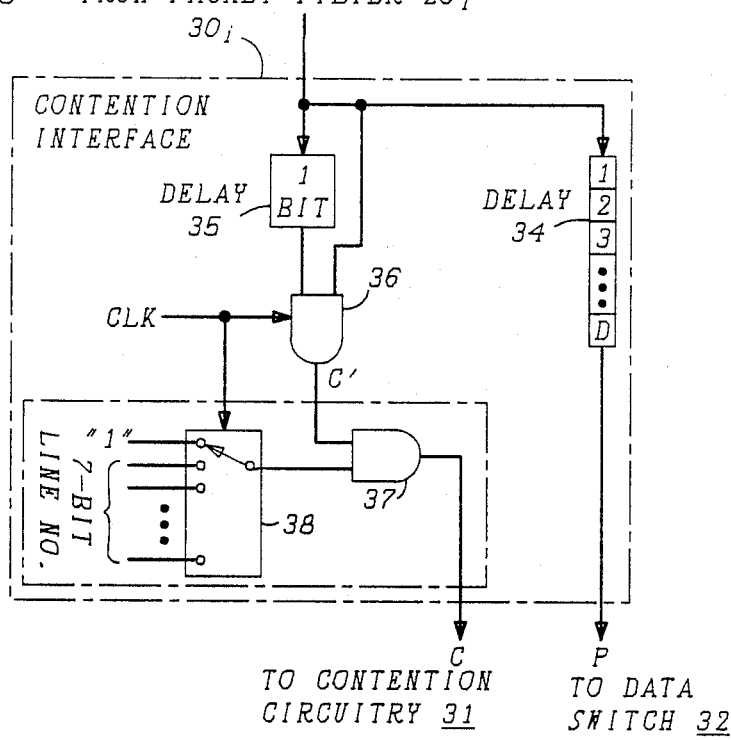
FIG. 6 shows an exemplary arrangement of a contention interface in the concentrator arrangement of FIG. 5.

A contention interface $30_i$ can be implemented in a straight-forward manner as shown in FIG. 6. In FIG. 6, the input from the associated packet filter $20_i$ is received at a delay means 34 which provides the necessary delay D as explained above. Concurrent therewith, the input signal is received in a 1-bit delay circuit 35 and an AND gate 36. This combination looks for the two leading 1s indicating a valid packet and generates an enable signal, C', to a second AND gate 37. Such enable signal permits an 8-bit code word, C, comprising a leading activity bit "1" and a 7-bit input line number (the one of the exemplary 128) to be transmitted from circuit 38 to contention circuit 31, where the input line number is its own input $10_i$ from which the valid packet was received. Therefore, output P is merely the delayed version of the input bit stream, and output C serves to signal contention circuitry 31 for the arrival of a valid packet that needs to enter immediate contention for subsequent transmission through the 128:8 data switch 32. The exact signal format for signal C again depends on the specific design of contention circuitry 31. The detection time for signal C to become active after a packet has entered contention interface $30_i$ should be no more than, for example, 2 bits because only the pattern of two consecutive 1's has to be matched for the present exemplary header bits. All C outputs are connected to contention circuitry 31 and the P outputs are connected to data switch 32. Contention circuitry 31 has the responsibility of resolving conflicts between multiple packet arrivals by deciding which of the inputs are to be connected to the 8 outputs through the exemplary 128:8 data switch 32.

Figure 7:
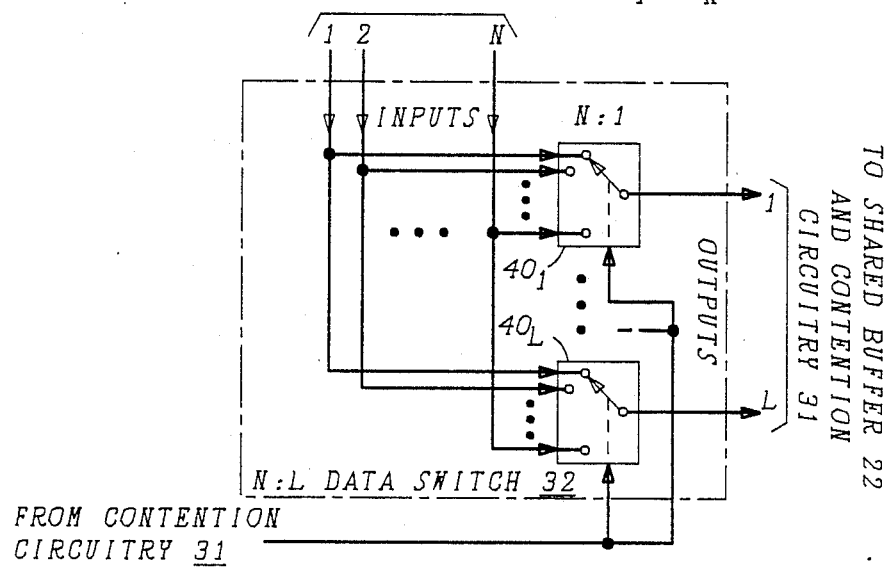
FIG. 7 illustrates a exemplary arrangement of the N:L data switch in the exemplary concentrator arrangement of FIG. 5.

The exemplary 128:8 data switch 32 is essentially a space-division switch which connects specific inputs to the 8 outputs upon command by the contention circuitry 31. New updates on its configuration are allowed at instants marked by the start-of-message clock, i.e, every 27 bits. Once a valid packet is granted a path through data switch 32 the same path is guaranteed for the entire duration of the packet. Various implementations are possible for data switch 32 as, for example, using a cross-bar type N:L switch, or using a separate 1:L for each input to access any output. Each of such implementations may provide a disadvantage of excessive signal delay or a cumbersome switch. The design shown in FIG. 7 overcomes some of these disadvantages and uses eight 128:1 multiplexers $40_1$ to $40_L$, responsive to control signals from contention circuitry 31, which permits any one of the N inputs to access the appropriate associated output as is well known in the art.

Figure 8:
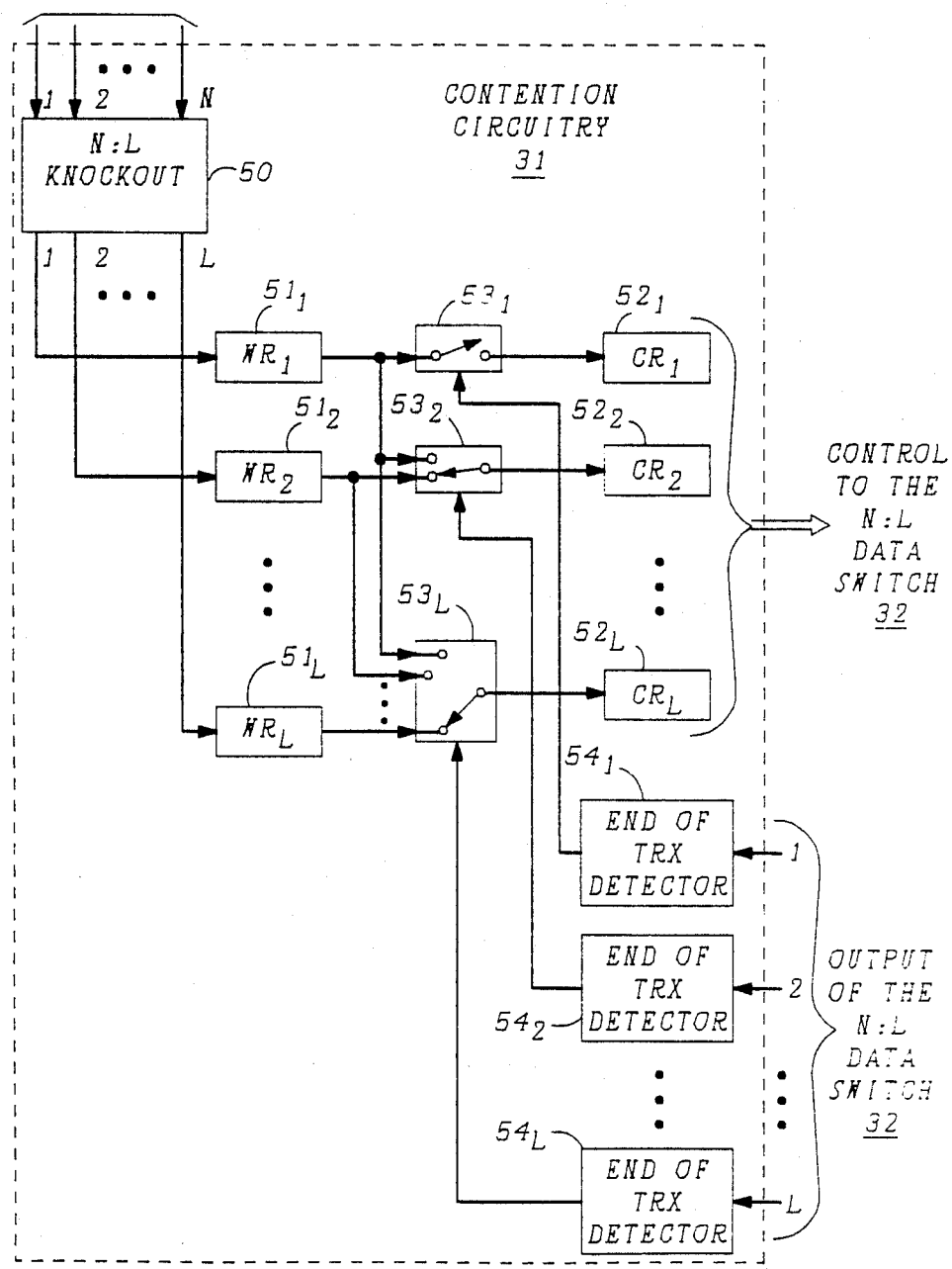
FIG. 8 is a block diagram of an exemplary block diagram of the contention circuitry in the exemplary concentrator arrangement of FIG. 5.

An exemplary design for contention circuitry 31 is shown in FIG. 8. When the arrival of a valid packet is detected in an associated contention interface $30_i$, its C output generates a digital word denoting its own input line number preceded by an activity bit of "1" as described hereinbefore. This is carried out at the onset of each start-of-message cycle which occurs every 27 bits in accordance with the exemplary arrangement proposed before. The activity bit in the C word is set to "0" for all cases other than the fresh arrival of a valid packet as can be seen from FIG. 6. These 8-bit words generated at the C outputs of contention interfaces 30 are supplied to contention circuitry 31 where they are regarded as individual packets for contention. These C words from the N contention interfaces $30_1$ to $30_N$ enter an N:L "knockout" concentrator 50 from which 8 winners are derived out of the 128 possible contenders.

An arrangement for an exemplary "Knockout" concentrator which can be used for concentrator 50 is described in the copending patent application filed for A. Acampora et al. concurrent with the present application. In a first section of such arrangement, the N inputs from the associated contention interfaces 30 are paired and enter a row of N/2 switching elements. This may be viewed as a first round of a tournament with N players, where the winner of each match emerges from a predetermined side of 2×2 switching elements and the loser from the other side. The N/2 winners from the first round advance to the second round where they compete in pairs as before using a row of N/4 2×2 switching elements. The winners in the second round advance to the third round and this continues until two compete for the championship; that is the right to exit the first output of concentrator 50. The losers from the first section of concentrator 50 can begin competing in a subsequent section before competition is finished in the next previous section. Delay elements can also be included to compensate for an odd number of players in any section. In such manner, L outputs can be derived from the N inputs. A packet losing L times, however, is "knocked out" of the competition and is discarded by concentrator 50 in its last section. In all cases, packets are only lost if more than L packets arrive concurrently at any time, which can be designed to be a low probability occurrence.

The winning line numbers from "Knockout" concentrator 50 are first stored in a set of registers $51_1$ to $51_L$ designated Winning Registers (WR). Winning Registers $51_1$ to $51_L$ are connected in parallel to another duplicate set of Control Registers (CR) $52_1$ to $52_L$, respectively, through a set of respective transfer control switches $53_1$ to $53_L$ under the control of End-of-Packet Transmission detectors $54_1$-$54_L$ respectively. As shown in FIG. 8, control register $52_1$ is only connected to winning register $51_1$, but control register $52_2$ may be connected to winning registers $51_1$ or $51_2$ via control switch $53_2$, and control register $52_L$ may be connected to any of the L winning registers $51_1$ to $51_L$ via control switch $53_L$. Control registers $52_1$ to $52_L$ receive the data from the winning registers 51, and the data are precisely the line numbers needed to set proper connections for Data switch 32. The data transfers between these registers can only occur at intervals synchronous to the start-of-message clock, or when Data Switch 32 can be updated because of the variable length packets passing therethrough.

For purposes of discussion, assume that at some moment of time all eight paths in the exemplary 128:8 Data switch 32 are active with valid packet data coming through. This implies that the activity bits in all eight control registers 52 are 1's. For each control register 52, as long as its activity bit is a "1", it would not accept any transfer from winning registers 51. The activity bit can only be reversed to a "0" upon detection of the end of a packet by each of the End-Of-Packet Transmission detectors $54_1$ to $54_L$, which detectors 54 are responsive to such signal formed by the 9-bit appended control word of FIG. 4 received from the N:L data switch 32. In such case, the particular control register $52_i$ involved has to decide from which of the winning registers 51 it should receive its next connection line number. Such transfer arrangement reflects the intentional priority technique that control register $52_1$ is entitled to the first winning line number, and register $52_1$ can take winning register $51_1$ only if control register $52_1$ does not ask for a transfer at the same time, otherwise register $52_2$ takes the line number from winning register $51_2$. With such logic, for i=2 to 8, each control register $52_i$ has to look at its predecessors, namely control registers $52_1$ to $52_{i-1}$ and count low many of them are asking for a transfer. Then control register $52_i$ will receive a transfer from the next one.

In a data transfer, the activity bit in a control register 52 is automatically carried over from the winning register 51, which could actually be a "0" in the event that no valid packet was available. The implementation required for such control is straightforward and involves only simple logic gates, flip-flops and adders. The control set-up time and the data transfer time between registers should be designed to be no more than, for example, 5 bits. Various delay requirements may be, for example: (1) the checking time for a valid packet arrival is 2 bits; (2) the contention time through "Knockout" concentrator 50 is 23 bits; and (3) the data switch 32 set-up time is 5 bits. Thus the exemplary delay totals 30 bits and a delay D of 32 bits in delay 34 of contention interface $30_i$ should, therefore, provide a reasonable margin to satisfy the timing requirements. It should also be noted that when the end of a valid packet under transmission through the exemplary 128:8 data switch 32 is detected, i.e., after the leading "10" of the last 9-bit control word of FIG. 4 has exited data switch 32, the next two bits in this past word are already in transit inside data switch 32, and only 5 bits remain before the next configuration for this particular output might have to take effect. For this reason, it is important to design the switch control set-up time and data transfer between the winning registers $51_1$ to $51_L$ and control registers $52_1$ to $52_L$ to be within 5 bits as suggested above.

Figure 9:
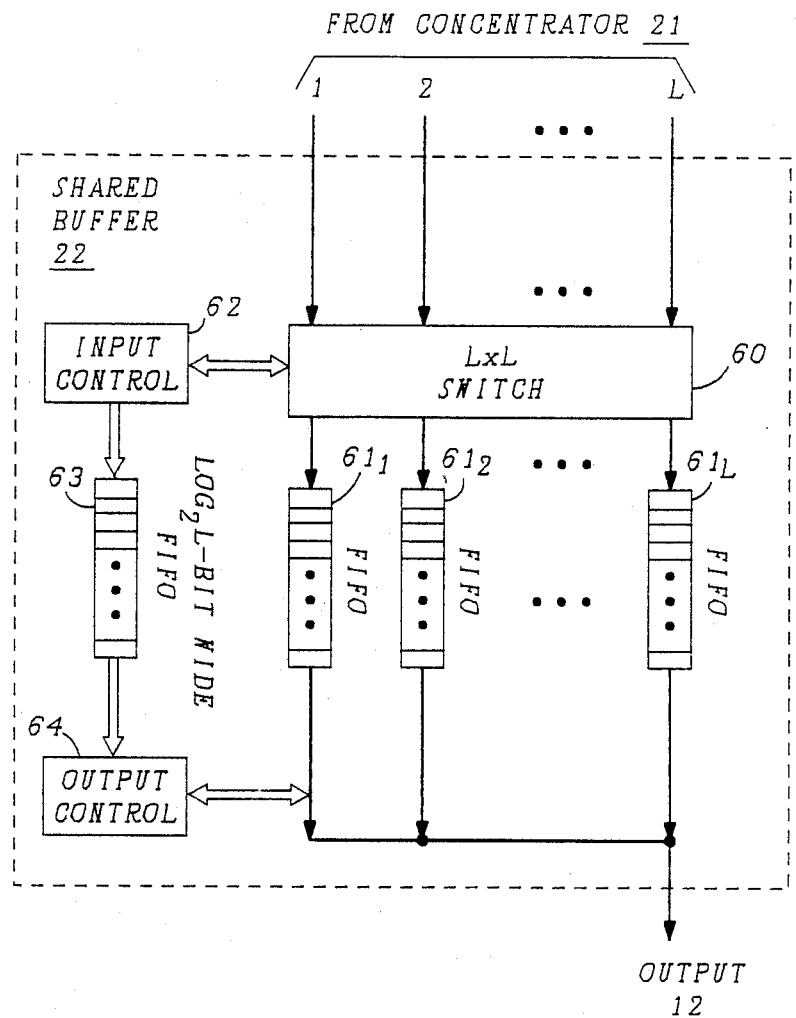
FIG. 9 shows an exemplary block diagram of a shared buffer arrangement in the bus interface unit of FIG. 2.

The L concentrator outputs then enter a shared buffer 22 which can comprise the exemplary arrangement shown in FIG. 9. In FIG. 9, shared buffer 22 is shown as comprising an LXL switch 60, a plurality of L First-In, First-Out (FIFO) buffers $61_1$ to $61_L$, and a control section including an input control 62, a $\log_2 L$ bit wide FIFO 63, and an output control 64. More particularly, shared buffer 22 receives the L data lines from concentrator 21 and feeds one output data line to the output interface module $17_i$. All of the shared buffer's input and output lines operate at the same data rate, e.g., the exemplary 50 Mb/s. If each switch output is modeled as an M/M/1/K queue as indicated in the book by L. Kleinrock entitled *Queueing Systems*, Vol. 1: *Theory*, John Wiley & Sons, N.Y., N.Y., 1975, at page 130, the buffer must be sized, for example, to hold approximately 60 packets to keep the overflow probability below $10^{-5}$ with an 85-percent load on the switch 11. The most demanding characteristic of shared buffer 22 is that it must preserve the first-in, first-out discipline as the variable-length packets come through. The arrangement of FIG. 9 accomplishes such task.

In the arrangement of FIG. 9, the L input line of switch 60 can be connected to any one of L FIFO buffers $61_1$ to $61_L$. When a new packet arrives from one of the input lines, an input controller 62 has to decide which of the L FIFOs this packet should go based on the Modular Packet Length of the new packet, as found in the second control word shown in FIG. 4, as well as the buffer occupancy status of the system. After making this connection, the input control 62 stores the FIFO number assigned for this packet in a separate FIFO 63 which has to be, for example, 3 bits wide if L=8. This latter FIFO 63 can be called the Packet Order FIFO as it contains the specific ordering of successive packets as they come into the system. The unloading of packets from the data buffers 61 is done according to the 3-bit word from packet order FIFO 63 via output control 64 so that the first-in, first-out discipline can be maintained. In other words, the output controller 64 fetches an exemplary 3-bit word from Packet Order FIFO 63 to direct the output to read a packet from a particular data buffer $61_i$. Then upon detection of the end of packet via the end control word of FIG. 4, output control 64 fetches another exemplary 3-bit address from FIFO 63 for pinpointing the next packet location in buffers $61_1$ to $61_L$. The main advantage of this technique is the ease of implementation with FIFO buffers. The disadvantage is that the FIFO buffers are usually slower in speed than random access memories (RAMs).

Figure 10:
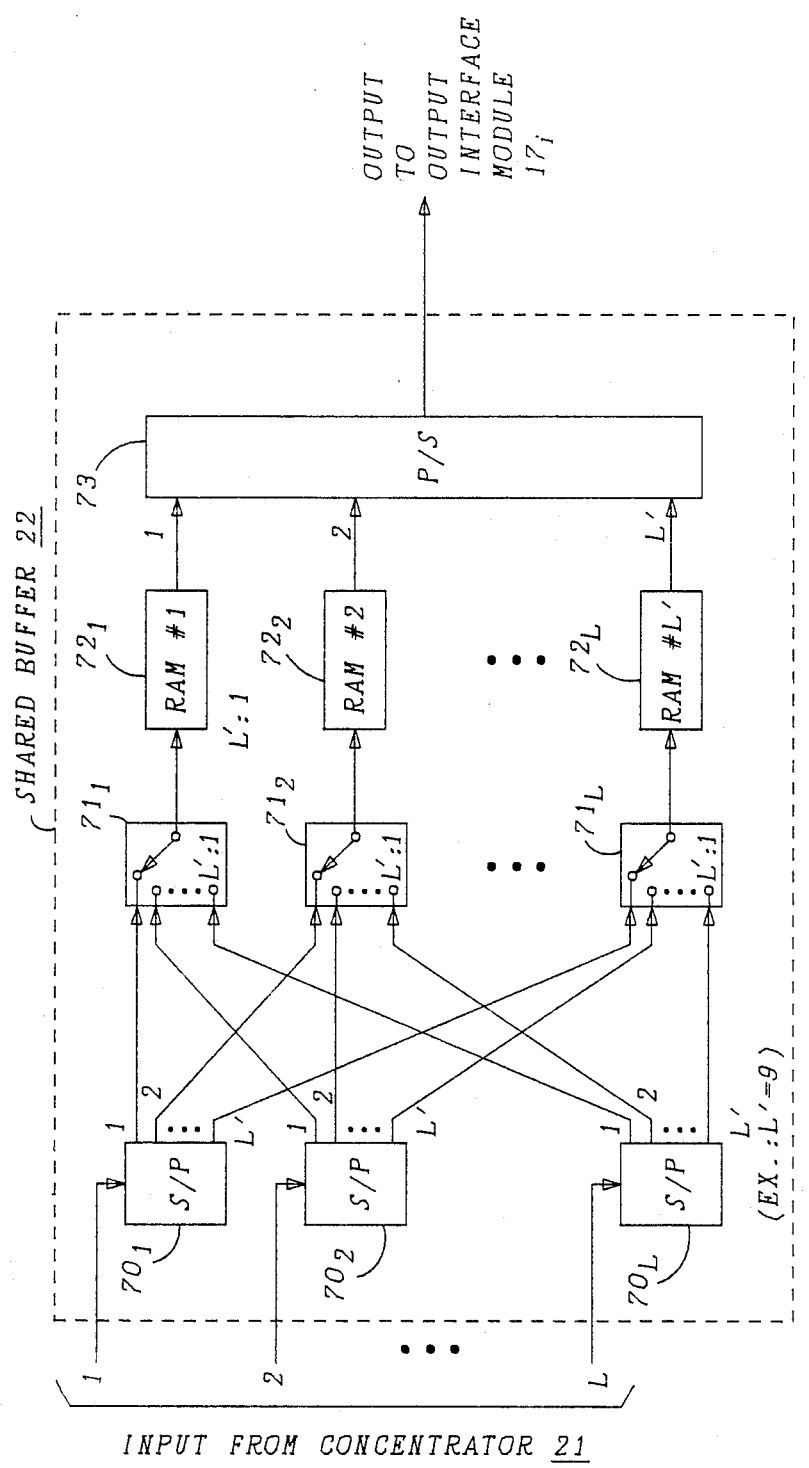
FIG. 10 is an block diagram of an exemplary alternative arrangement for the shared buffer in the bus interface unit of FIG. 2.

It is to be understood that various approaches can be used for implementing shared buffer 22, and that the present invention is not limited to the arrangement of FIG. 9. For example, an alternative arrangement for shared buffer 22 can comprise the arrangement shown in FIG. 10. FIG. 10 is a block diagram with parallel random access memories to realize the equivalent of a circular buffer. The L input lines, each running at the same data rate, are individually connected to a separate corresponding one of serial-to-parallel (S/P) converters $70_1$ to $70_L$. For ease of illustration, 9 bits will be selected as an example for the S/P converter length and hereinafter L' will be considered as equal to 9. The serial 9-bit words as received are converted to 9 bits in parallel. The first bits of all the input lines are collected through the multiplexers $71_1$ to $71_L$, to go into the first connected RAM in a serial manner at the input data rate. Similarly the other bits from the various inputs are also grouped correspondingly for writing onto separate RAMs as shown.

As a result, if one looks at the parallel RAMs $72_1$ to $72_L$, at a given instant in time during the write cycle, the RAMs are accepting a 9-bit word from the same input line. In other words, the simultaneous 9-bit parallel words from the L input lines are stacked across the L' (9) parallel RAMs (or equivalently one 9-bit wide RAM) one after another in time. Their write addresses are not contiguous as they must follow the assigned positions for their packet locations. It should be noted that it takes only L write cycles at the input data rate to finish the recording of the L input words. Where L=8 and L'=9, this leave one cycle vacant in the 9-cycle period for the nine parallel RAMs, and it can conveniently be used for reading. The read addresses for consecutive read cycles are contiguous, except at the end of each packet where a jump might be required. The output from RAMs $72_1$ to $72_L$, is parallel-to-serially (P/S) converted in P/S converter 73 to provide serial data to the output interface module $17_i$. A key characteristic of this implementation is that the RAM speed required is precisely that of the input data rate.

By using the Modular Packet Length control word, as shown in FIG. 4, in the control header, the memory space can be allocated as sensibly as the up-to-date status permits. In fact if an incoming packet fails to declare its approximate length, there is no choice but to assume the maximum in its storage allocation. It is easy to see that under high congestion conditions, a packet declared to be small will have a much better chance to enter into the buffer than an undeclared or, therefore, a maximum-sized one. When the huge disparity between large and small packets are taken into account, e.g., 10 bytes versus 512 bytes, it make sense to drop a large packet under high congestion first so that a considerable number of the small ones can get through.

It is to be understood that the abovedescribed embodiments are simply illustrative of the principles of the invention. Various other modifications and changes may be made by those skilled in the art which will embody the principles of the invention and fall within the spirit and scope thereof. For example, it should also be noted that the interconnection architecture of the present "Knockout" switch 11 lends itself to broadcast and multicast features. Since every input 10 is available at the bus interface units 15 to every output 12, arriving packets can be addressed to, and received by, multiple outputs. Additionally, the present switch can also grow modularly in the manner described for the fixed-length packet "Knockout" switch in the copending patent application filed for A. Acampora et al. on the same day as the present application.

What is claimed is:

1. A switching arrangement employing decentralized control and distributed routing of variable-length packets of information, the switching arrangement comprising:
   a plurality of N output terminals (12);
   a plurality of N input terminals (10) for receiving N separate input signals, each input signal comprising variable-length packets of information in a time division sequence; and
   switching means (11) disposed to receive up to N overlapping variable-length packets of information from the N input terminals during a predetermined time period and for routing each of the packets of information to the destined one of the N output terminals, the switching means being responsive to the reception of a plurality of up to N overlapping variable-length packets of information destined for a particular output terminal for storing up to L of such packets of information for subsequent transmission to the destined output terminal on a first-in, first-out basis from packets of information stored in any subsequent predetermined time period while discarding any overlapping variable-length packets of onformation above the number L, where L<N.

2. A switching arrangement according to claim 1 wherein the switching means comprises:
   a plurality of N buses (14), each bus being connected to a separate one of the N input terminals for propagating an associated received input signal therealong; and
   a plurality of N bus interface units (15), each bus interface unit comprising
   an output connected to a separate one of the N output terminals of the switching arrangement,
   means (20) for detecting whether any of the N concurrent variable-length packets of information propagating on the plurality of N buses are destined for the associated output terminal of the switching arrangement, and for passing such packets of information to separate outputs of the detecting and passing means;
   means (21) for concentrating the N concurrent output signals from the detecting and passing means into L concurrent output signals which appear at separate ones of L output terminals of the concentrating means, where N>L and the L output signals include all of the concurrent variable-length packets of information destined for the associated output up to a maximum of L of such packets of information; and
   buffering means (22) responsive to the L output signals from the concentrating means for temporarily storing each of the variable-length packets of information destined for the associated output and then transmitting such stored packets of information in a first-in, first-out sequence.

3. A switching arrangement according to claim 2 wherein the buffering means comprises:
   a plurality of L packet buffers (61) for temporarily storing the variable-length packets of information received from the concentrating means and destined for the associated output of the switching arrangement; and
   control means (60, 62-64) for directing each of the concurrently received variable-length packets of information from the concentrator means into a separate one of the plurality of L packet buffers and for routing each of the packets of information stored in the plurality of L packet buffers onto the associated output terminal of the switching arrangement in a first-in, first-out sequence.

4. A switching arrangement according to claim 2 wherein the control means of the buffering means comprises:
   a switch (60) including (a) L input terminals for receiving separate ones of the L concurrent output signals from the concentrating means during any instant of time, (b) L output terminals, and (c) means (62-64) for routing any packets of information received from the concentrating means at each of the L inputs, and destined for the associated output terminal of the switching arrangement, to separate ones of the L output terminals;
   an input controller (62) for causing the routing means to interconnect each of its L input terminals to the appropriate one of its L output terminals for the duration of the transmission therethrough of each of the variable-length packets of information to be stored in the associated plurality of L packet buffers; and
   an output controller (63, 64) for routing the variable-length packets of information stored in the plurality of L packet buffers onto the associated output terminal of the switching arrangement in the first-in, first-out sequence.

5. A switching arrangement according to claim 2, 3 or 4 wherein the concentrating means comprises:
   means (30) for determining, at any instant of time, which of the N inputs comprise valid variable-length packets of information destined for associated output terminal of the switching arrangement; and
   means for directing each of up to L concurrently received valid variable-length packets of information from the determining means to a separate free one of the L output terminals of the concentrating means while discarding any concurrent packets of information above the value L.

6. A switching arrangement according to claim 5 wherein the directing means of the concentrating means comprises:
   contention means (31), responsive to the determining means of the concentrating means detecting that any one or more of the N input terminals includes a separate packet of information destined for the associated output terminal of the switching arrangement, for generating control signals indicative of which of any concurrently received packets of information are to be directed to certain ones of the L output terminals of the concentrator means.

7. A switching arrangement according to claim 6 wherein:
   the determining means transmits both (a) a control signal indicative of the reception of a valid packet of information destined for the associated output terminal of the switching arrangement and (b) the received packet signal delayed by a predetermined time period to the contention means; and
   the contention means comprises:
   a contention circuit for determining which of the L output terminals of the concentrating means are already transmitting a variable-length packet of information, and responsive to the control signals from the determining means, for generating second control signals indicative of which one of the free output terminals of the concentrating means a newly arrived valid packet of information should be directed to, and
   N:L switching means including N input terminals and L output terminals, the N:L switching means being responsive to second control signals from the contention circuit for routing up to L concurrent variable-length packets of information to the L outputs of the concentrating means.

8. A switching arrangement according to claim 1 or 2 wherein the switching arrangement further comprises:
   input interfacing means connected to the plurality of N input terminals comprising;
   means for detecting the start of each variable-length packet of information, and
   means for synchronizing the start of each received variable-length packet of information with the start of a predetermined submultiple time period which is common to, and less than, the overall time period for the reception of any possible variable-length packet of information.

9. A switching arrangement according to claim 8 wherein the submultiple time period corresponds to one or more bytes of information forming a part of any possible variable-length packet of information to be received.

10. A switching arrangement according to claim 8 wherein the input interfacing means further comprises:
    means for (a) determining both the output terminal of the switching arrangement to which each received variable-length packet of information is destined and the end of each packet of information, and (b) adding a first control word within a first submultiple time period of each packet of information including the address of the output terminal to which that packet of information is destined, and a second control word at the end of each packet of information including an end-of-transmission code for that packet of information.

11. A switching arrangement according to claim 10 wherein the switching arrangement further comprises:
    output interfacing means connected to the plurality of N output terminals comprising
    means for removing any control words added by the input interfacing means and for formatting each variable-length packet of information from the switching means according to a predetermined protocol required by an external device which is to receive the packet of information.

* * * * *